June 25, 1968  L. P. HATCH  3,390,078
SEPARATING SALTS HAVING INVERTED SOLUBILITY CURVES
Filed Dec. 29, 1964
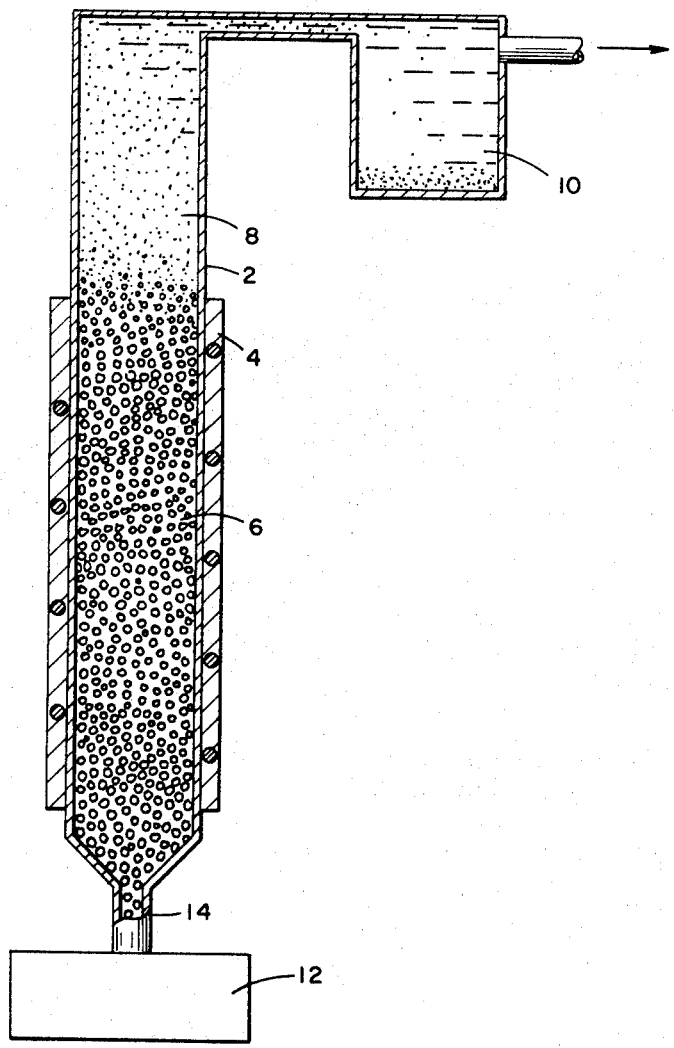
INVENTOR.
LORANUS P. HATCH
BY United States Patent Office 3,390,078
Patented June 25, 1968

3,390,078
SEPARATING SALTS HAVING INVERTED
SOLUBILITY CURVES
Loranus P. Hatch, Brookhaven, N.Y., assignor to the
United States of America as represented by the United
States Atomic Energy Commission
Filed Dec. 29, 1964, Ser. No. 425,664
3 Claims. (Cl. 210—56)

ABSTRACT OF THE DISCLOSURE

This invention discloses a process for heating saline solutions containing salts having inverted solubility curves to temperatures above 260° F. comprising upwardly flowing the saline solution through a walled heat exchanger having heating means contained in the walls while maintaining a bed of particles in a fluidized state with the upward flow of the water, said fluidized particles being in contact with walls of the exchanger.

---

This invention is related to an efficient, continuous method and apparatus for heating saline waters to high temperature, said waters having salts contained therein which have inverse solubility curves. More particularly, it is related to a process and apparatus for desalination of saline waters such as sea water.

In recent years, due to a progressively increasing demand for fresh water, those skilled in the art have made a considerable effort to seek more economic methods of desalinating sea water. One method currently being considered and used is that of flowing a preheated solution of saline water through a series of flash evaporators having progressively lower pressures, which pressures are sufficiently low to cause a substantial portion of the saline water entering each evaporator to be vaporized to steam. The steam, in turn, is condensed on heat exchanger tubes passing through the evaporator which tubes contain the saline solution flowing countercurrently upstream of and at a lower temperature than the evaporating solution such that the solution in the tubes is preheated by receiving the latent heat of the condensing steam. Such systems are highly efficient because each unit amount of fresh or potable water condensing on the heat exchanger tubes gives back to the system substantially all of its highly important latent heat value which is utilized, in effect, to vaporize an equivalent amount of steam, at slightly lower pressure and temperature in succeeding evaporator stages. Thus, such a multi-stage system is capable of giving many pounds of potable water product for each heat input value supplied to the system necessary for the evaporation of one pound of steam from the original amount of saline water. Other types of evaporation systems, as distinguished from flash evaporators, are being used and/or proposed for use in desalinization processes but the principle of conservation or reuse of the heat of evaporation (or latent heat) through the use of multi-stage or vapor compression systems is emphasized in all cases where economy of operation and low unit costs of desalinated water is desired.

It is obvious that systems capable of preheating the saline solution to and operating at high temperatures and pressures can employ a larger number of recovery stages in the system and increase the overall efficiency and economics of the process. However, it is recognized by those skilled in the art that a severe problem arises when it is attempted to heat saline water such as sea water, above 260° F., due to the fact that some of the salts contained therein such as calcium sulfate, precipitate out onto the walls of the heat exchanger as a scale and this scale causes a sharp drop in the heat transfer coefficient of the exchanger and greatly lessens the economic efficiencies that could otherwise be gained from the system. This scaling problem has thus sharply limited the number of stages that can be employed in multi-stage flash evaporation systems and other recovery systems.

Most solutes increase in solubility with increasing temperature. Some salts, however, such as calcium sulfate, anhydrous sodium sulfate, and sodium carbonate monohydrate, etc., in aqueous solution show what are known as inverted solubility curves; i.e., the solubility of these substances decreases with increasing temperatures. When a solution such as sea water which contains many such salts having inverted solubility curves, is heated in a heat exchanger, the solubility of these solutes is lowest at the tube wall, where the temperature is at its highest. Precipitation at the elevated temperatures therefore, takes place at the tube wall of the heat exchanger, generally with the formation of a hard, dense, strongly adhering scale which scale greatly lowers the value of the heat transfer coefficient for the heat exchanger. Further, the substance having an inverted solubility curve will often include considerable quantities of materials possessing normal solubility curves, thus further decreasing the efficiency of the heat exchange system.

In order to remove such scale formations from heat exchange systems, the prior art has resorted to the use of mechanical devices such as reamers and chemicals such as acids and alkalis. Obviously such scale removal methods are costly both in scale removal and lessening of the efficiency of the heat exchange system.

It is an object of this invention to provide those skilled in the art with an efficient economical heat exchange process usable for heating solutions containing salts having inverted solubility curves dissolved therein to high temperatures without scale forming on the walls of the heat exchange apparatus.

It is a further object of this invention to provide those skilled in the art with a highly efficient economical process operable at high temperatures to heat and/or to desalinate sea water and other brackish saline waters and solutions containing salts having inverse solubility curves.

It is a further object of this invention to provide those skilled in the art with an efficient economical method and apparatus for heating solutions to high temperatures without impairing the heat transfer coefficients of the heat exchanger system and without scale formation on the walls of the heat exchange vessel, even though said solutions contain potentially scale-forming substances such as salts having inverted solubility curves and/or organic matter.

Other objects of this invention will be shown in part hereinafter and will in part be obvious

SUMMARY OF THE INVENTION

It has been discovered that the above and other objects of this invention can readily be accomplished by the use of a process for heating saline solutions such as sea water, which have salts having inverted solubility curves with respect to the solvent of the solution dissolved therein and organic matter, in apparatus not forming a part of this invention such as, a heat exchanger in which the saline solution is caused to flow upwardly through a heat exchange vessel, said vessel having heating means operatively connected to the walls of the heat exchange vessel, heating the saline water flowing through the vessel while contacting the walls of the heat exchange vessel having the heating means connected thereto with a fluidized bed of particulate solids, said particulate solids being maintained within the heat exchange vessel in a fluidized state by virtue of the upward flow of the saline solution through the bed as illustrated in the accompanying drawing:

The figure shows in cross-section the principle of this invention. I have further discovered a heat exchange apparatus for heating saline solutions containing salts having inverted solubility curves to high temperatures comprising a walled vessel 2 having pumping means 12 operatively connected to the vessel capable of causing an upward flow of the saline solution 14 through the vessel, heating means 4 operatively connected to the walls of the vessel capable of heating the saline solution flowing through the vessel to high temperatures, and a bed of particulate solids 6 within the walls of the vessel maintained in a fluidized state by the flow of the water through the vessel, the fluidized bed of particulate solids being in contact with the walls of the vessel containing the heating means operably connected thereto, the excess of the salt having the inverted solubility curve contained in the heated saline solution is precipitated out of the saline solution and retained in the solution 8 flowing out of the fluidized bed and can be collected in a fluid particle separator such as a setting tank 10.

The fluidized bed as used in my invention results when the fluid which is to be heated flows upward through the heat exchange vessel through a bed of suitably sized, solid particles at a velocity sufficiently high to cause a suspension and overall volumetric expansion of the bed of particles, thus imparting to the individual particles a significant degree of independent mobility and an appearance of fluidity to the bed. Fluid velocities used in my invention must be intermediate between those which would lift the bed of particles into a state of suspension or fluidization and those would sweep the particles out of the heat exchange vessel.

The particulate solids found usable in my invention for forming the fluidized bed in the heat exchange vessel can be any solids which are substantially not dissolved and/or reacted away by the solution when the solution is heated and having a real or apparent density which is greater than that of the solution being heated. Thus, for example, we have found that particles of common sand are an excellent material for use as the solids portion of the fluidized beds when my invention is used in a desalination process.

Example I

This example is given to demonstrate the practice of my invention in recovering potable water from simulated sea water utilizing a heat exchanger unit which was operated at high temperature.

The apparatus utilized in this example consisted of a heat exchanger composed of two four foot lengths of Monel pipe having an inside diameter of one inch jointed together in line by connection with a threaded fitting containing oppositely positioned glass sight ports within the fitting, with said apparatus placed in an upright position. Four 15-foot lengths of No. 20 Nichrome armour coated resistance wire were spiral-wound around the outside of the upright pipe in four evenly spaced sections and the pipe lengths covered by each of these sections was approximately two feet. Each section of wire was independently connected to an individual 10-amp., 110 volt Variac connected with a source of electrical current. This electrical system allowed for the controlled application of heat to the upright heat exchanger. The heat exchanger was heavily insulated on the outside. A first Monel tube 8-inches in length and heavily insulated, having a one-half inch inside diameter was flange-connected to the top of the upright heat exchanger and to a heavily insulated 4-liter expansion tank situated directly above the heat exchanger, which tank had a pressure gauge and a blow-off valve situated at the top of the tank which was preset to discharge at about 150 p.s.i.g. The first Monel tube also had a separate arm connected to a pressure relief valve which was preset to discharge at 120 p.s.i.g.

A second Monel tube about 14 feet in length heavily insulated having an inside diameter of one-half inch was independently connected to the expansion tank and to the inlet of a circulating pump and thereafter from outlet of the pump to the bottom end of the heat exchanger and flange-connected thereto. A force feed pump being fed from a reservoir of untreated saline solution was connected to the system through the second piece of Monel tubing at a point between the expansion tank and circulating pump.

A No. 40 stainless steel screen (U.S. Bureau of Standards, Standard Screen Series, 1919) was located within the flanged connection at the lower extremity of the heat exchanger. The lower portion of the upright pipe of the heat exchanger was filled to a depth of approximately 30-inches with common sand (approximately 600 grs.) having a particle size ranging between from about 0.84 mm. to about 0.59 mm. The sand rested on the screen when in the settled state.

Sixty (60) liters of simulated sea water was prepared containing 24.53 grams/liter of sodium chloride, 11.1 grams/liter of magnesium chloride, 4.09 grams/liter of sodium sulfate, 3.1 grams/liter of calcium chloride, 0.695 gram/liter of potassium chloride, 0.201 gram/liter of sodium bicarbonate, 0.101 gram/liter of potassium bromide, 0.027 gram/liter of boric acid, 0.042 gram/liter of strontium chloride, 0.003 gram/liter of sodium fluoride, the balance of the solution being made up of distilled water. The simulated sea water solution was placed in the reservoir and fed into the system until all of the system was completely filled with the solution except for approximately ½ the volume of the expansion tank. The level of saline solution in the expansion tank was well above the connections of the Monel tubings with the tank. The solution was circulated through the system by means of the circulating pump until the circulation velocity of the solution in the heat exchanger was sufficient to suspend and expand the sand in the heat exchanger into a state of fluidization said bed having a height of approximately four feet so that the bed was extended from the screen at its lower end to the region of the sight glass ports at its upper end. The sight glasses permitted visual observation of the bed both as to its state of fluidization and its expanded depth.

Nine-hundred-ninety (990) watts (9 amp., 110 volts) of electrical power were applied to each of the two lower heating coils of resistance wire wound on the heat exchanger until the solution in the system reached a temperature of 342° F., and a pressure of 126 p.s.i.g. at which point a portion of the heated solution discharged from the system through the pressure relief valve, the amount of solution in the system being maintained constant by the feed pump.

The system was run for a total of approximately 20 hours while maintaining the temperature of the solution in the heat exchanger at about 340° F.

Example II

The apparatus and procedures of Example I were utilized in this example.

The sample of water heated in this example was obtained from the Atlantic Ocean approximately five miles off the shore of Long Island. The sea water used in this example was tested and found to contain 0.371 gram/liter calcium as $Ca^{++}$, 2.44 grams/liter $SO_4^{--}$, 1.2 grams/liter of magnesium $Mg^{++}$, 0.0146 gram/liter bicarbonate $HCO_3^-$ and 24.5 grams/liter sodium chloride as well as other salts and organic matter normally found in sea water.

The actual sea water in this example was heated in the same heat exchanger system of Example I to a temperature of 340° F. and flashed off at pressures ranging downward from 120 p.s.i.g. to atmospheric pressure for 30 hours. The distillate from the flashed off steam was tasted, physically analyzed and found to be potable.

The saline solution in Examples I and II had a temperature of about 340° F. as it exited from the heat exchanger. However, that portion of this solution which was recycled through the system cooled to a temperature of about 290° F. prior to re-admission to the heat exchanger, the cooling being due to heat losses in the pump which was not insulated. That portion not recycled discharged through the pressure reducing valve to a receiver maintained at normal atmospheric pressure.

Analysis of the heated solution in Examples I and II shows that the concentration of the calcium sulfate had been reduced due to its inverse solubility to levels commensurate with its known solubility at the elevated temperature, the excess of the calcium sulfate was precipitated out and was retained in the fluid portion of the system and not deposited on the wall of the heat exchanger.

Physical examination of the walls of the heat exchanger showed that no scale had formed on the walls of the heat exchanger which were in contact with the heated solutions and the fluidized bed since said walls retained their original shiny appearance. In Examples I and II the heat transfer coefficients remained substantially constant throughout the entire operation of the system.

Temperature is not a limitation in my novel invention. Solutions containing inverted salts can be heated in accordance with the practice of my invention to temperatures as high as pressure limitations of the equipment will permit with no scale formation and without impairment of the heat exchange coefficients. Thus it is obvious that my invention frees those skilled in the art from the temperature limitations previously imposed upon heat exchanger systems by virtue of scale formation due to the presence of salts having inverted solubility curves in the solution to be heated.

It is to be understood that my invention is useful whenever it is desirable to heat to high temperature solutions containing salts having inverted solubility curves and/or other scale-forming materials such as organic matter and it is not limited to use in multi-stage flash evaporation systems used in conventional desalinization processes and that liquid and gas fluidized bed technology and techniques which are well known to those skilled in the art can be readily employed in my novel process and apparatus. Thus, for example, conventional heat exchangers suitable for use in fluidized bed systems, means for introducing (loading) and discharging (unloading) the bed material into and out of the heat exchanger can readily be incorporated in and utilized in the practice of my invention.

The use of my invention will permit the construction and operation of multi-stage flash evaporation systems for distilling sea water having a far greater number of stages than are permissible in conventional systems, thus permitting sharp increase in efficiency of operation with corresponding decrease in unit costs of desalinated water. Further, my invention is ideally suited for use in vapor compression distillation systems and other systems where scale formation otherwise limits the temperature to which the saline solution can be heated.

I claim:
1. In the process of separating dissolved salts from an aqueous saline solution, wherein the solution is heated to precipitate out the dissolved salts having inverted solubility curves with respect to the solvent of said solution, the steps of:
    (a) upwardly flowing the saline solution through a walled heat exchange vessel, said vessel having heating means operatively connected to the walls of said vessel; and
    (b) heating the saline solution flowing through the vessel to a temperature above 260° F.; and
    (c) contacting the walls of the heat exchange vessel having the heating means connected thereto with a fluidized bed of particulate solids; said particulate solids being maintained within the heat exchange vessel in a fluidized state by virtue of the upward flow of saline solution through the bed.
2. A process as in claim 1 wherein said saline solution is sea water.
3. A process as in claim 2 wherein said bed of particulate solids is composed of sand.

References Cited

UNITED STATES PATENTS 1,916,367  7/1933  Green _____ 210—20

OTHER REFERENCES

W. F. Langelier et al.: "Scale Control Sea Water Distillation Equipment," J. Ind. and Eng. Chem., 42 (1), pp. 126–130 (1950).

W. F. Langelier: "Mechanism and Control of Scale Formation in Sea Water Distillation," J. Am. Water Works Assoc., 46 (5), pp. 461–469 (1954).

MORRIS O. WOLK, *Primary Examiner.*

S. MARANTZ, *Assistant Examiner.*